United States Patent [19]

Watson

[11] 4,072,419
[45] Feb. 7, 1978

[54] FRAME COUNT CUER FOR PHOTOGRAPHIC FILM PRINTERS

[75] Inventor: Charles J. Watson, Elgin, Ill.

[73] Assignee: Bell & Howell Company, Chicago, Ill.

[21] Appl. No.: 509,590

[22] Filed: Sept. 26, 1974

[51] Int. Cl.² ............................................ G03B 27/78
[52] U.S. Cl. ..................................................... 355/83
[58] Field of Search .................. 355/35, 83; 235/92 V

[56] References Cited

U.S. PATENT DOCUMENTS

| | | | |
|---|---|---|---|
| 3,299,272 | 1/1967 | Furukawa et al. | 235/92 V |
| 3,476,477 | 11/1969 | Balint | 355/83 X |
| 3,586,438 | 6/1971 | Gyori | 355/83 |
| 3,716,299 | 2/1973 | Balint | 355/83 |

OTHER PUBLICATIONS

The Optoelectronics Data Book for Design Engineers; Texas Instr. Inc.; pp. 145-149.

*Primary Examiner*—L. T. Hix
*Assistant Examiner*—M. L. Gellner
*Attorney, Agent, or Firm*—John Hoffman; Robert J. Schneider; Roger M. Fitz-Gerald

[57] ABSTRACT

A frame count cuer for controlling the operation of a continuous photographic film printer either of the continuous motion or incremental motion type. As the "preprint" film and the overlaying "raw stock" are passed through the printer, a signal is generated corresponding to the quantity and direction of travel of the film drawn across the exposure aperture. A counter is incremented or decremented by the signal and provides an integral footage and frame count of the amount of film passing through the printer. The information from a punched scene length tape is used to set a storage unit to the desired scene length and the setting of the storage unit is compared with the counter by a coincidence detector. Upon coincidence, a cue signal is fed from the coincidence detector to the printer light valve control unit. The light valves are preset with the information obtained from a punched paper tape in accordance with the predetermined preferred light level and the hue for the scene to be printed. The frame count cuer includes a presettable cue advance unit to advance the cue signal by a predetermined number of frames to accommodate the inherent reaction time of the printer light valves. The entire frame count cuer is photon coupled to the photographic film printer to prevent inadvertent "noise" from being transferred to the cuer.

16 Claims, 7 Drawing Figures

FRAME COUNT CUER FOR PHOTOGRAPHIC FILM PRINTERS

BACKGROUND OF THE INVENTION

Continuous and incremental photographic film printers have been used which include both notch and RF systems for automatically controlling the light valves of the printer to vary the intensity and hue of the light for the scene being printed. These devices have some inherent disadvantages because the mechanical pickups which engage film notches would damage the film if the printer were operated at too fast a speed. The patcher used on the film strip in the RF system tended to fall off or get lost particularly during clearing of the film.

This invention relates to an apparatus for controlling the operation of a photographic film printer, and more particularly relates to an apparatus for reading a scene length tape to automatically control the light valves of such a printer so as to provide intensity and hue correction for the scene being printed and to permit operation of the film printer at a significantly higher speed.

During the operation of a film printer, an unexposed film or "raw stock" is placed in an overlying relation to a "preprint" film for contact printing. The "preprint" film and the overlaid "raw stock" are in sprocket hole registration and driven by a single sprocket wheel across an aperture for exposure by a controlled light source. The "raw stock" thus is exposed in accordance with the image of the "preprint" film and thereafter developed by conventional methods. Various scenes of the "preprint" film which make up the complete film are frequently photographed at different locations and under varying lighting conditions. Therefore to minimize or eliminate the lighting and color variations which occur as a result of variations in lighting during the initial filming, each of the scenes of the "preprint" film often require different optimum printing levels and color balance during exposure of the raw stock. Prior to the exposure of the "raw stock", the "preprint" film is visually inspected by a skilled operator for the purpose of determining the intensity and hue of the correction desired for each scene. According to the conventional practice, lighting correction for each scene is recorded by punching a paper tape. During printing, the film printer utilizes and reads the punched tape to control the light valve of a variable light source focused upon the printer exposure aperture.

The length or position of the scene to which the light setting relates is similarly recorded on a second punched tape in a binary coded decimal (BCD) code. This information may be in the form of a film length measure starting at the termination of the last scene and is termed hereinafter the "batch" method of scene length measurement. Alternatively, the information may be in the form of a film length measure starting at a predetermined starting position on the film such as a punched "sync hole" and is termed hereinafter the "milestone" method of measuring scene position.

Therefore, during the initial viewing of the master "preprint" film, the operator punches two tapes, a first recording the scene light level and color correction desired, and a second recording the scene length to which the correction corresponds following either the "batch" or "milestone" methods of scene length measurement. The use of separate scene length and light control tapes is particularly convenient since this combination readily adapts to practices presently in use. The conventional methods using the notch or RF systems require the operator of a photographic laboratory to punch a first tape carrying the lighting intensity information for control of the light valves and apply notches or magnetic patches to the film indicating the location of a scene change. As will be described hereinafter, in lieu of notching or patching, the operator can more conveniently punch a second tape carrying scene length information thus making the illustrated embodiment totally compatible with the present laboratory practices.

As previously described, the "preprint" film and "raw stock" film are in sprocket hole registration and driven through the printer in an overlying position. A pulse generator provides an output signal relating to the amount and direction of film driven across the exposure aperture. The actual film travel then is compared to the scene length information recorded on the scene length tape, and when the two sources of information coincide, a cue signal is generated. The cue signal actuates the light valves causing them to attain the desired lighting and color correction for the scene being printed. The light printing level and color correction are adjusted between each scene upon command in accordance with the recorded tape information.

A suitable light source for use with the illustrated embodiment is shown in U.S. Pat. No. 3,502,409, assigned to the assignee of the present invention, and includes dichroic mirrors which serve to separate a spectral light source into three primary color light beams. Further details thereof are incorporated by reference herein. However, suffice it to say that three light valves, each of which relates to a primary color, are adjustably set to control a selected portion of the light in one of the primary color beams. Each light valve includes a movable vane which intercepts a primary color beam and a bar-type adder unit having a plurality of solenoid actuated slides wherein the desired vane position is stored. Signals from the light valve tape representing the selected intensity and hue correction factors are applied to the slide solenoids causing the adder unit to expand linearly by an amount corresponding to the correction desired. The information in the bar-type adder unit is converted to an angular rotation of a vane memory and stored therein. The angular position of the vane memory is transferred to the vanes upon receipt of a cue signal by actuating a vane solenoid which in turn moves a vane into the path of the primary color beam of an amount determined by the angular position of the vane storage memory. Therefore, in response to a cue signal, the lighting information stored in the valve is transferred to its respective vane and the valve is cleared to receive the lighting information corresponding to the next scene to be printed.

Previous frame count cuers have suffered from several design problems. Particularly, direct electrical connection with the film printer often has caused or permitted small electrical signals (noise) to be transferred from the film printer to the cuer which can interrupt the logic of the cuer. It also is desirable to have the frame count cuer operate in a reverse direction to avoid the necessary rewinding of the "preprint" film after each printing operation or alternatively to permit continuous or "loop" printing of a short subject whose film length is several times smaller than that of a conventional "raw stock" reel of film. It also is desirable to include a method for advancing the cue signal a predetermined number of frames to allow for the time delay caused by the light valve memory and solenoids. For convenience of tape preparation and bi-directional operation the scene length is coded with the information related to the film scene, which information is thereby varied by the cue advance unit to provide advanced or delayed cue signal generation.

SUMMARY OF THE INVENTION

The purpose of this invention is to provide an improved frame count cuer which monitors the quantity and direction of travel of film passing across an exposure aperture and compares this measure with a prerecorded program. Upon the occurrence of the selected condition, the cuer generates a signal which causes the level and hue of the printer exposure light to adjust in accordance with a prerecorded program representing a preferred scene correction.

Another object is to provide an improved frame count cuer of the character described which will operate in a bidirectional or loop mode to eliminate the need for rewinding the "preprint" film after each printing operation.

Another object is to provide a presettable cue signal advance to compensate for the inherent reaction time of the variable light source.

Another object of the invention is to provide a frame count cuer which is adaptable to accommodate any film format having up to 100 integer frames per foot.

Another object of the present invention is to provide an optically isolated interface between the frame count cuer and the photographic film printer to eliminate noise problems.

The preferred embodiment of the invention is directed in brief to a frame count cuer for monitoring the passage of film through a photographic film printer and for controlling the operation of the printer in accordance with the monitoring information wherein the printer includes a selectively controllable light source and a signal generator providing an output signal related to the quantity of film passing through the printer. The frame count cuer includes a tape reader for providing a signal indicating the length of a film scene in integral units of length greater than a frame (e.g., feet) and frames. Storage means is provided for storing the information from the tape reader. A direction sensing means receives two input signals from the signal generator and provides a "forward" signal for film passing through the printer in a forward direction or a "reverse" signal for film passing through the printer in a reverse direction. A counter unit is connected to the direction sensing means for receiving the "forward" or "reverse" signals to provide an increasing or decreasing count in integral units of length and frames of film passing through the printer. The counter includes a frame counter driven by the signal generator and an integral unit length counter which is actuated when the frame count reaches a predetermined value equivalent to an integral unit of film length. A programmable means is provided for selectively varying the predetermined value to correspond with the format of the film passing through the printer. A coincidence detector is provided for comparing the information in the storage means with the count of the counter and thereby to provide a signal to said film printer upon the occurrence of a predetermined relation between the storage means and the counter unit.

DESCRIPTION OF THE PREFERRED EMBODIMENT

GENERAL DESCRIPTION

Figure 1:
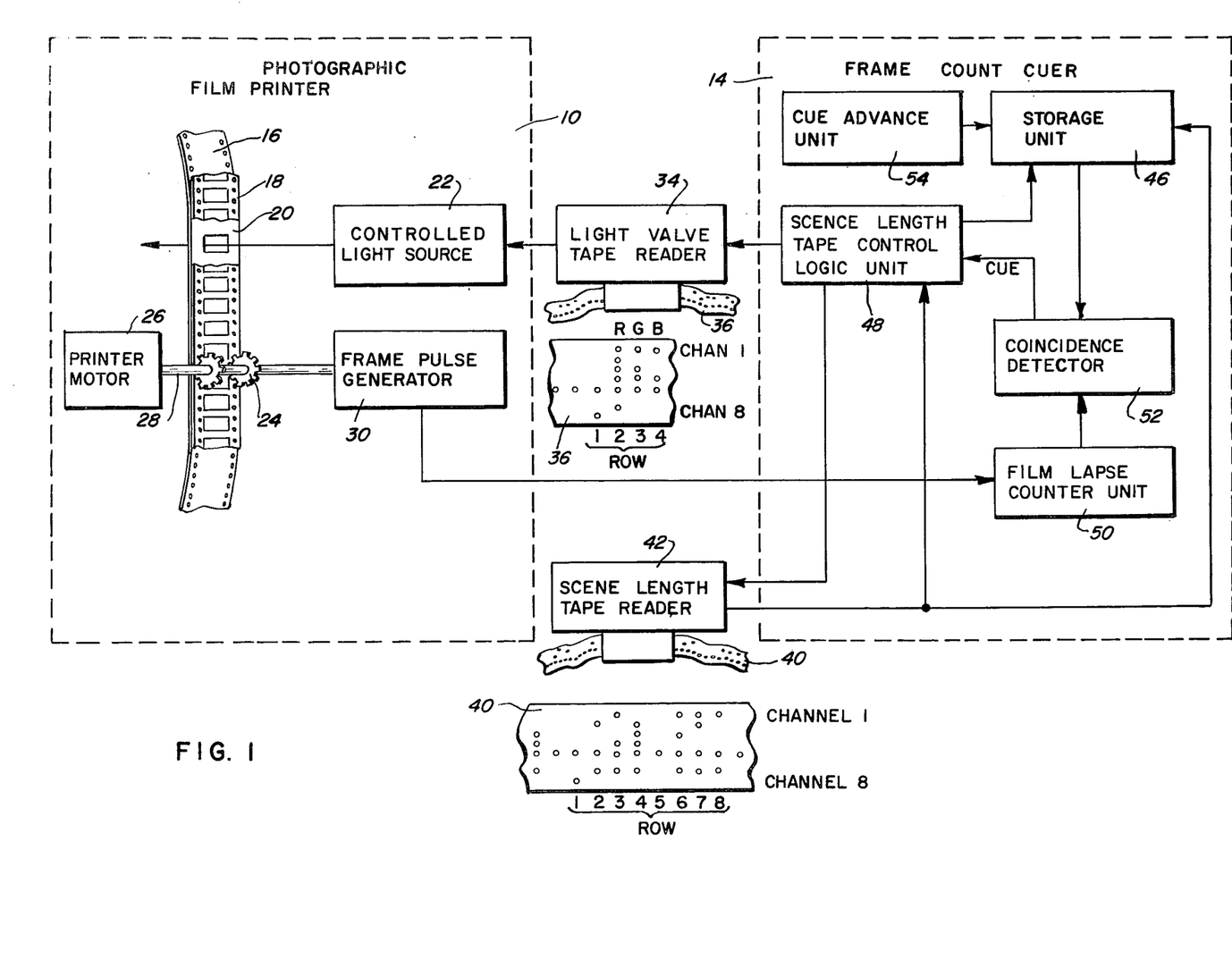
FIG. 1 is a block diagram, partially in schematic, illustrating a photographic film printer in combination with the frame count cuer of the present invention.

Referring to FIG. 1, a continuous or incremented photographic film printer 10 is illustrated together with a frame count cuer 14 embodying the concepts of the present invention. The photographic film printer 10 is symbolically illustrated in combination with a film of raw stock 16 in a contact print relationship to a preprint film 18. Both the raw stock 16 and the preprint film 18 are in sprocket hole registration and are drawn across an exposure aperture 20. A controlled light source 22 is focused at the aperture 20 to expose the raw stock 16 to the image on the preprint film 18. The controlled light source 22 includes light valves which vary the intensity of the red, green and blue components of the light source, thereby permitting the intensity and relative composition of the light to be selectively varied. The preprint film 18 and raw stock 16 are driven across the exposure aperture 20 by a sprocket wheel 24 which is connected to and driven by a printer motor 26 by a sprocket shaft 28. A frame pulse generator 30 is coupled to the sprocket wheel shaft 28 to generate pulse signals related to the quantity and direction of travel of film drawn across the exposure aperture 20. In the illustrated embodiment, the pulses are generated independently of any information contained on the preprint film 18 and are coupled to the frame count cuer 14.

The light valve settings of the controlled light source 22 are controlled by a light valve tape reader 34 which steps a prepunched paper tape 36 carrying the hue and intensity information for each of the preprint film scenes. As illustrated, the preferred tape 36 is eight channels wide and punched with four rows or steps carrying the lighting information for a single scene. The first row or step is generally blank with the exception of the first scene. Serving to indicate the start of the first scene, the eighth channel of the first row of the film scene carries a singular hole. The second, third and fourth rows respectively carry information relating to the red, green and blue intensity values. As will subsequently be described, the light valve tape reader advances in response to a start signal until the eighth channel hole is sensed. Thereafter, the tape steps four positions in response to a cue signal from the frame count cuer 14, setting the slides of the red, green and blue light valves.

The cue signal initiates two operations. First, it causes the information stored in the valve slides of the controlled light source 22 to be transferred to the light vanes so as to adjust the hue and intensity of the light source in preparation for printing a scene. Secondly, it advances the tape 36 and the tape information is stored in the slides of the light valves which corresponds to the lighting information for the next scene. It should be noted that the slides of the light valve are set to their memory position before the related scene is printed and transferred to the vane in response to a cue signal.

Scene length information is recorded upon a second punched paper tape, the scene length tape 40, in binary coded decimal form and is read by a scene length tape reader 42. As seen in FIG. 1, the tape 40 is provided with eight channels across the width of the tape and is punched in eight rows or steps along the lengthwise direction of the tape. The beginning leader of the tape carries a third, fourth and seventh hole punch to identify the tape as the scene length tape 40 so that it cannot be confused with the light valve tape 36. Within the information on the tape, the first row or step generally is blank with the exception of an eight hole punch at the end of the tape leader. Channels 1 through 4 of rows 2, 3, 4 and 6 carry footage information and rows 7 and 8 provide frame information. As will subsequently be described, row 5 is used for synchronization detection to assure that the scene length tape 40 is in proper synchronization with the frame count cuer 14. A hole is punched in the seventh channel of the tape 40 at every row where information is to be read by the frame count cuer. Therefore, since the fifth row carries no information, the seventh channel does not include a hole punch and therefore if the seventh hole was punched it would indicate that the tape 40 is not in synchronization with respect to the frame count cuer. It should be understood that although this particular light valve tape 36 and scene length tape 40 configurations have been described, various other tape formats and information media may be used without departing from the concept of this invention.

The film length information relating to the subsequent scene length is fed to the frame count cuer from the scene length tape reader 42 in binary coded decimal form. Serving to store the scene length information is a storage unit 46 forming a part of the frame count cuer 14. As previously mentioned, the fifth row of the scene length tape 40 is blank. The frame count cuer includes a scene length tape control logic unit 48 which in addition to other functions senses the fifth row information of the scene length tape 40, and in the event that the tape, due to a malfunction, is out of synchronization, the tape reader 42 will detect the information holes in the fifth step. The apparent punch holes in the fifth step are noted by the tape control logic unit 48 which interrupts the operation of the printer 10 thus facilitating correction for the malfunction before valuable film footage is wasted.

The pulses from the frame pulse generator 30 are fed into a film lapse counter unit 50 which maintins an increasing or decreasing count of the film quantity driven across the aperture 20. The film length information is stored in the counter unit 50 in integral feet and frames having a unit length less than a foot. Alternatively, the film length information may be stored in feet and fractions of a foot, or in frames alone. However, the illustrated embodiment of the footage and frame count is to be preferred since it corresponds to the practice generally followed in photographic laboratories. The lab technicians are generally trained to perceive a scene length in terms of feet, and portions of a foot in frames, and the preferred embodiment follows such training practices.

The film length signal from the scene length tape reader 42 is stored in the storage unit 46 and is continuously compared with the counter valve of the film lapse counter unit by a coincidence detector 52. Upon a coincidence between the counter unit 50 and the storage unit 46, a cue signal is generated and fed to the light valve tape reader 34 via the tape control logic unit 48, and to the scene length tape reader which steps the reader 42 eight rows. The cue signal also causes the information stored in the slides of the controlled light source 22 to transfer to the vanes and the light valve tape reader 34 to step to reposition the slides with information for the next scene.

The frame count cuer 14 also includes a programmable cue advance unit 54. The cue advance unit 54 will increment or deciement the storage unit 46 a predetermined number of frames to accommodate the inherent reaction time of the controlled light source.

FRAME COUNT CUER

Figure 2:
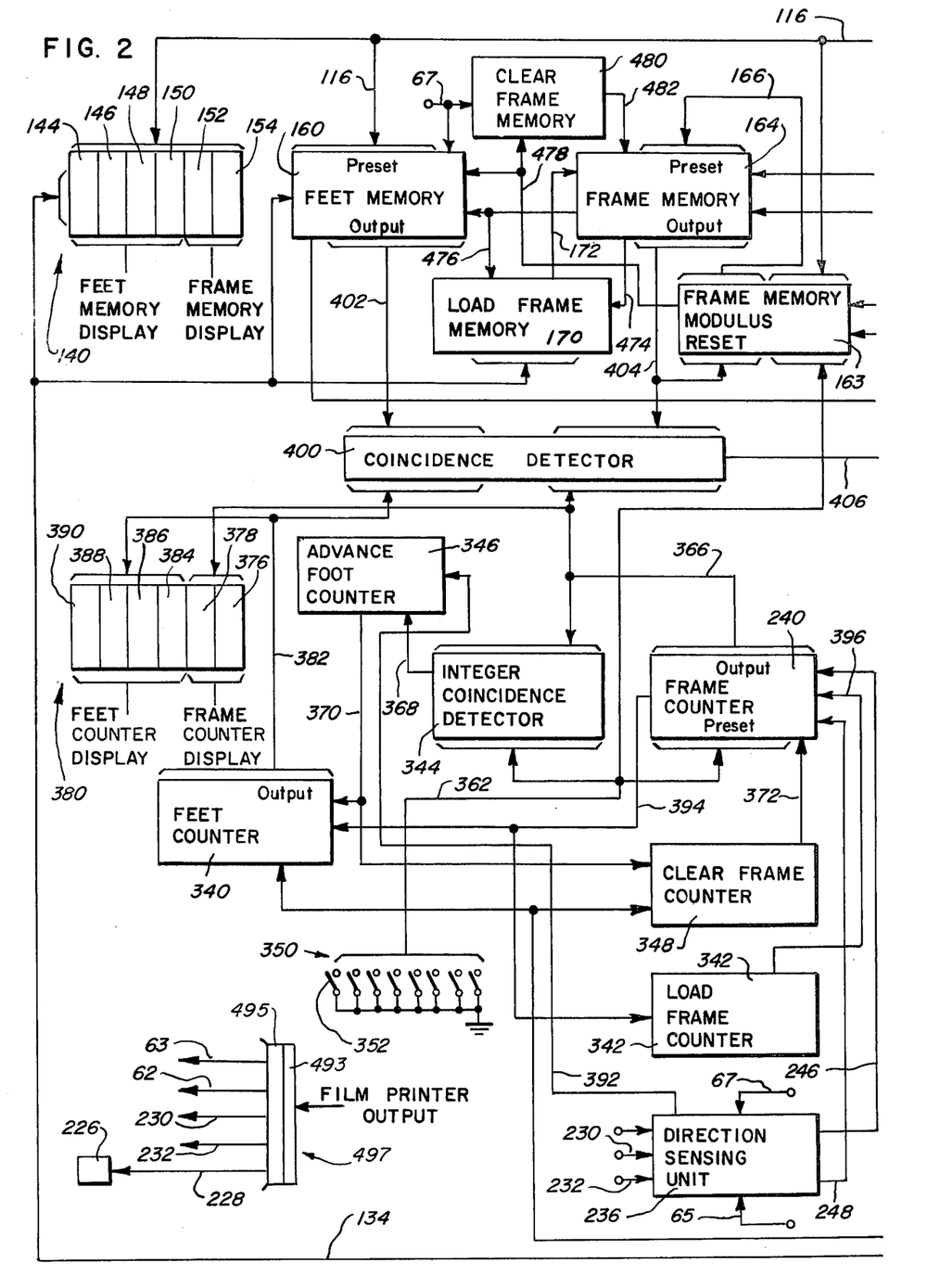
FIG. 2 is a schematic block diagram, in greater detail, of certain of the components illustrated in FIG. 1.
Figure 3:
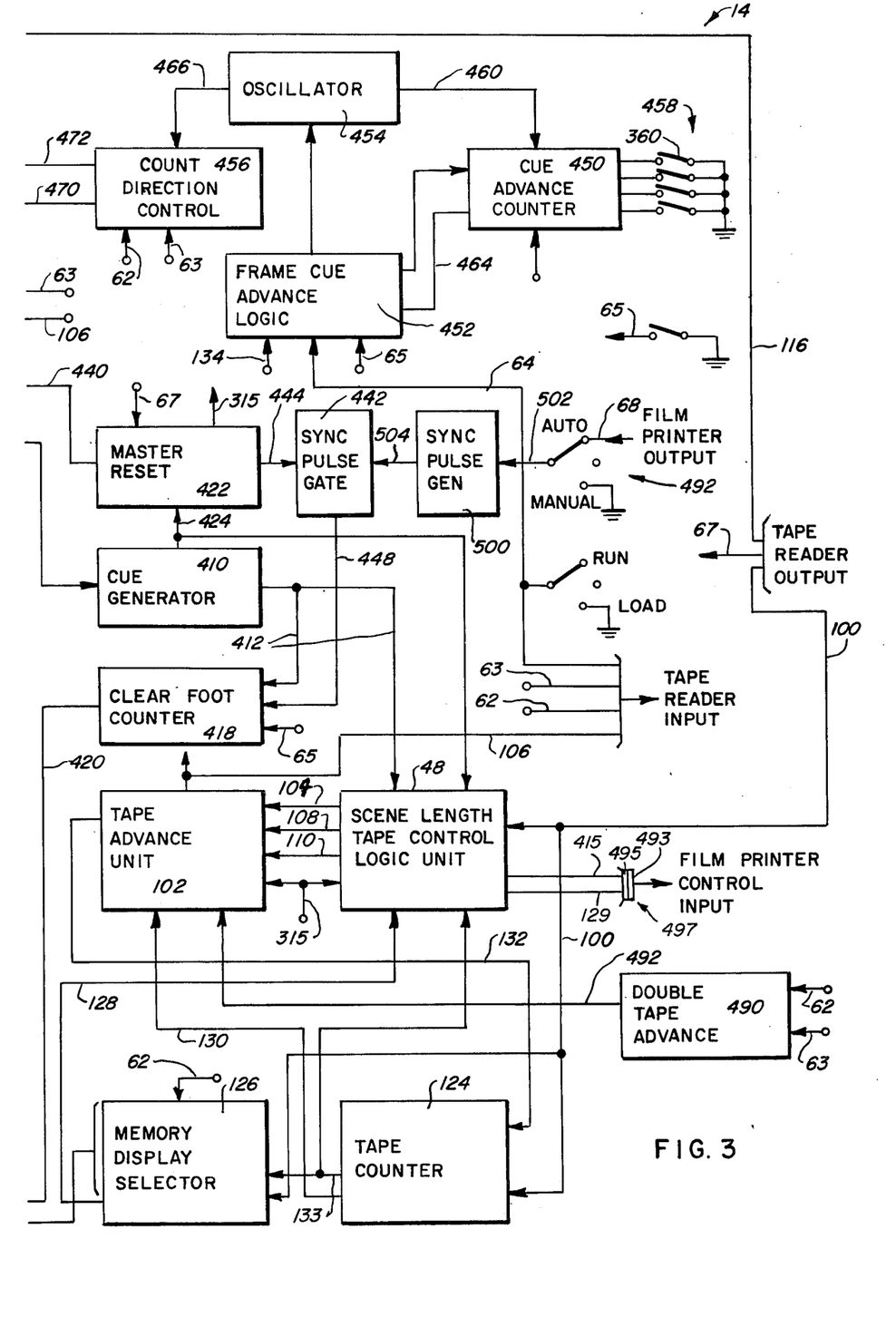
FIG. 3 is a schematic block diagram, in greater detail, of certain of the components illustrated in FIG. 1, and, in combination with FIG. 2, provides an illustrative diagram of the present invention.

FIGS. 2 and 3 are arranged so that they may be aligned side-to-side to provide a complete operative block diagram of the frame count cuer 14. Although the subsequent discussion will describe certain operational functions and relationships for various components of the frame count cuer, it should be understood that the discussion of the occurrence of individual functions are only exemplary and provided by way of illustration to facilitate an understanding of the embodiment. The isolated individual components of the frame count cuer generally are all commercially available units or combinations of commercially available units utilizing integrated circuitry for which the time period of response is negligible.

The block diagram is of the conventional type wherein some lines are shown as discontinuous. However, the identification of a line by a numeral indicates that all lines identified by the same numeral are at the same potential. By way of illustration, two input lines, a forward 62 and a reverse 63 are controlled by a master switch on the film printer 10. A load line 64 when valid, signals the frame count cuer 14 not to read any tape information through the tape reader 42 because the operator is merely loading a prepunched scene length tape 40. A batch line 65 is connected to various components of the frame count cuer 12 to cause the various components to reset to zero after each film scene length. During operation using a milestone method scene length tape, the batch line 65 is not valid so that the various components to not reset after each film scene length. A ready line 67 carries a signal from the scene length tape reader 42 to various components of the frame count cuer 14 prior to the reading of its first section of information. A start line 68 from the film printer 10 signals the frame count cuer 14 to reset some of the frame count cuer components at the beginning of each cycle.

STORAGE

The scene length tape reader 42 is a conventional type tape reader which is connected to or mounted on the frame count cuer as shown on the right of FIG. 3. Tape information from the channels 3, 4, 7, 8 and a date validation signal is fed into the scene length tape control logic unit 48 through line 100. The tape control logic unit is connected to a tape advance unit 102 by line 104 and instructs the tape advance unit to advance the tape reader under the below described conditions. At the beginning of a tape, the tape control logic unit 48 signals the tape advance unit 102 to continue advancing the scene length tape 40. The tape advance unit 102 through its output line 106 signals the tape reader to "slew" which causes the tape reader to continue moving the tape. When the tape reader 42 reads the hole in columns 3, 4 and 7 at the leading end of the tape 40, the tape control logic unit identifies the tape 40 as a scene length tape, it halts the slewing of the tape advance unit through its output line 108 when it reads a punched hole in column 8. Input line 110 then signals the tape advance unit 102 to energize the tape reader 42 to begin reading the rows of information. The information read by the tape reader is fed through line 116 to the storage unit 46 and a display unit as will be described in detail below. Each time that a valid bit of information is read by the tape reader 42 a contact signal is fed to the tape logic unit 48 via line 100 and also to a tape counter 124 and a memory display selector 126. A contact signal causes the tape counter 124 to advance one step and indicates to the memory display selector that valid data has been entered. If the fifth row of tape contains valid information, the memory display selector 126 instructs the tape control logic unit 48 through line 128 that the tape is out of sequence on the reader. The logic unit 126 signals the film printer to stop via line 129. If row five on the tape is blank the reader continues to read. The memory display selector instructs the storage unit 46 to store the scene length information in a corresponding position related to the information position on the tape 40 as described hereinafter. The tape counter 124 continues to count each step and after the eighth step, or the last line of input data, signals the tape advance unit through line 130 to stop. The tape advance unit 102 then signals the tape counter to reset via line 132. The count from the tape counter 124 is relayed to the memory display selector 126 in binary coded decimal form by line 133. The memory display selector 126 is a one of ten decoder and transforms the binary coded decimal into decimal form. The decimal form signal is fed into a memory display panel, generally designated 140 via line 134. This signal will identify which of the seven display columns is to receive the input data from each row of information.

Referring to line 116 the successive row information is fed into the memory display 140 and registered in the various columns indicating the scene length information in feet and frames. The lefthandmost column 144 records in decimal form the information supplied by the scene length tape corresponding to the thousands of feet figure from the second row of information. The next column 146 records the third row of information corresponding to hundreds of feet. The next column 148 records the information from the fourth row in tens of feet and the next column 150 records the information from the sixth line in units feet. The next column 152 records the informaion from the seventh line in tens of frames and the final column 154 records the eighth row of information in unit frames from 0 to 9. Simultaneously, the information from lines 2, 3, 4 and 6 is fed into a feet memory unit 160 via line 116. The signal from line 134 indicates the correct storage position for each bit of information from the tape reader 42. The frame information corresponding to rows 7 and 8 of the scene length tape 40 is read by a frame memory modulus reset unit 163 which will input that information into a frame memory unit 164 via line 166. The signal from line 134, indicating the position of the information from rows 7 and 8 of the tape, is fed into a load frame memory unit 170 which, via line 172, instructs the frame memory 164 as to which position or storage unit the information is to be stored. Thus, the scene length information from columns 1 through 4 of rows 2 through 8 are stored in the feet and frame memory units 160 and 164 and also on the visual memory display 140 to permit the user to read the integral footage and frame length information which has been transferred to the storage units.

PULSE GENERATOR AND DIRECTION SENSING

As previously described, a frame pulse generator 30 is connected to the sprocket shaft 28 to provide information as to the quantity and direction of travel of the film through the film printer 10. More particularly, referring to FIG. 4, the frame pulse generator 30 includes a chopper wheel 200 which is mounted on one end of the sprocket shaft 28. The chopper wheel includes a plurality of apertures or slots 202 around the periphery which are used to calculate the direction of travel and the quantity of film passing through the printer. The chopper wheel 200 is mounted to the shaft 28 by a plurality of lock screws 204 through arcuate slots 206 formed in the chopper wheel. This arrangement permits the chopper wheel 200 to be azimuthally aligned with respect to the sprocket 24.

Figure 4:
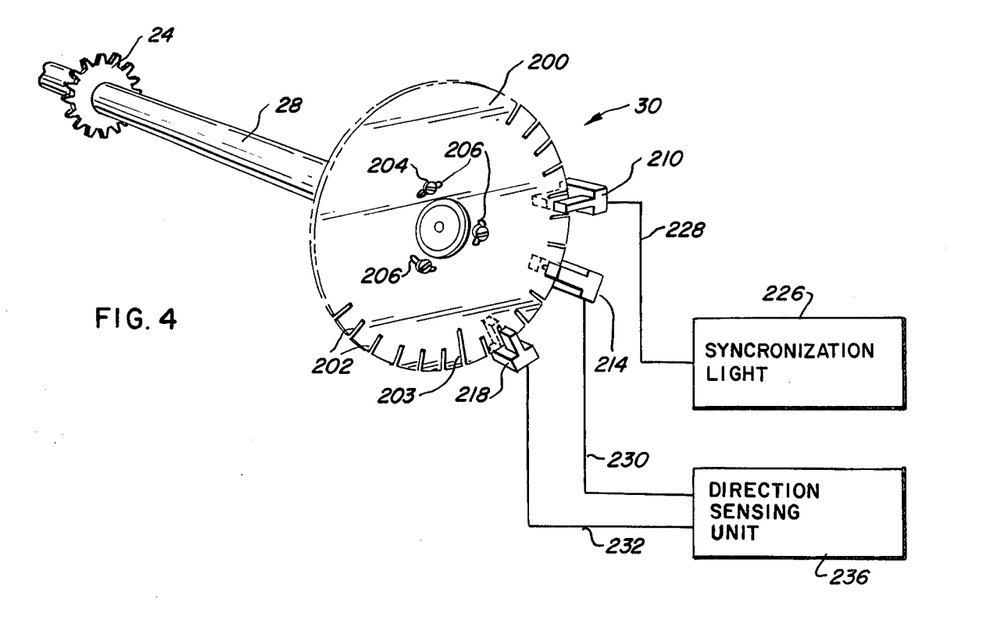
FIG. 4 is a perspective view of the chopper wheel mounted on the sprocket shaft and showing the optical sensors of the pulse generator.
Figure 6:
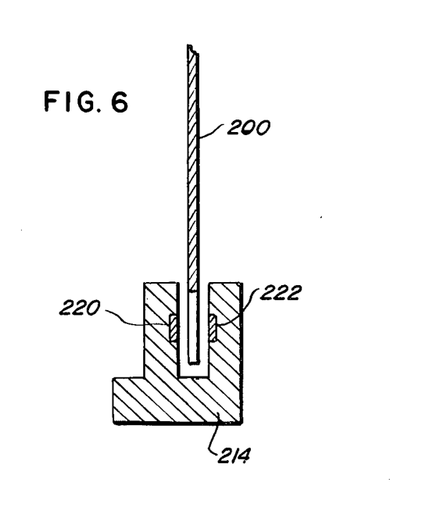
FIG. 6 is a sectional view of one of the optical sensors taken generally along the line 6—6 of FIG. 5.

It is necessary that the pulse generator 30 output be non-ambiguous, that is, it shall faithfully generate pulses corresponding to film movement independent of velocity. The pulse generator also must not create ambiguities during multiple direction changes when the disc slots or holes 202 are near the sensors such as may occur when an operator is manually positioning the printer sprocket during film synchronization. Therefore a combination of three sensors, 210, 214 and 218 are used to sense the movement of the chopper wheel 200. Looking to FIG. 6, each sensor includes a portion on either side of the chopper wheel 200. A light emitting diode 220 is positioned on the sensor on one side of the chopper wheel 200 and a light sensitive transistor 222 is positioned on the opposite side of the chopper wheel in alignment with the light emitting diode 220. Each time a slot 202 passes between the light emitting diode 220 and the light sensitive transistor 222, a signal or pulse will be generated.

One of the sensors, 210 in FIG. 4, is known as a detent sensor. It is provided to synchronize the sprocket wheel 24, and the preprint film 18 with the aperture 20. The detent sensor 210 will generate a pulse and transmit a signal to a synchronization light 226 via line 228 when the film is properly oriented with respect to the aperture and a slot 202 is present between the photocell 220 and transistor 222 of the detent sensor 210. The angular adjustment of the chopper wheel 200 by means of arcuate slots 206 permit azimuthal adjustment of the chopper wheel with respect to the sprocket wheel 24 for initial synchronized alignment during the installation of the chopper wheel 200 and the sensor 210.

It is also contemplated that the sensor 210 can be used to identify only one slot 202 on the chopper wheel 200.

Some laboratories desire to use a film printer to generate special effects in the finished movies. In order to do this the raw stock is run through the film printer two or more times for double exposures. During these operations it is critical to realign the once-exposed raw stock and the second preprint film to the identical sprocket holes used for the first print. To accomplish this the chopper wheel 200 includes one slot 203 which is cut deeper than the remaining slots 202. The sensor 210 is moved in radially so as to recognize and generate a signal at only the deep slot 203. This arrangement assures the user that the film is realigned to the sprocket as during the first printing.

The remaining two sensors, 214 and 218, are also adjustably mounted to permit correct relative positioning when installing the pulse generator. The relative positioning of the two sensors 214 and 218 is a critical feature of the present invention. The pulses from these sensors 214 and 218 are transmitted via lines 230 and 232 to a direction sensing unit 236 which will compute both the quantity of film passing the aperture 20 and also the direction of travel of the film. For this reason, referring to FIG. 5, the sensor 214 and the sensor 218 are aligned in quadrature or 90° out of phase as shown. Thus, as the center line of sensor 214 is on the center line of one of the slots 202 the center line of the sensor 218 is on the leading edge of another slot 202 displaced from the previous slot. During rotation of the sprocket 24 and the chopper wheel 200, the peak pulse generated by the sensor 218 will be delayed from the peak pulse output of the sensor 214 by the time period required for the chopper wheel 200 to rotate through an angle equivalent to one-half of a slot 202. A direction sensing unit 236 will read the output from the sensors 214 and 218 to calculate the amount of film passing the aperture 20, discriminate direction and increment or decrement a frame counter 240 accordingly.

The frame pulse generator 30 when coupled to the direction sensing unit as described below can always calculate a correct count. In previous pulse generators, when loading the printer, if a slot was moved into alignment with a sensor, and then moved out of alignment in an opposite direction, the counter would increment one unit. The problem is eliminated by the present design as described below.

Figure 5:
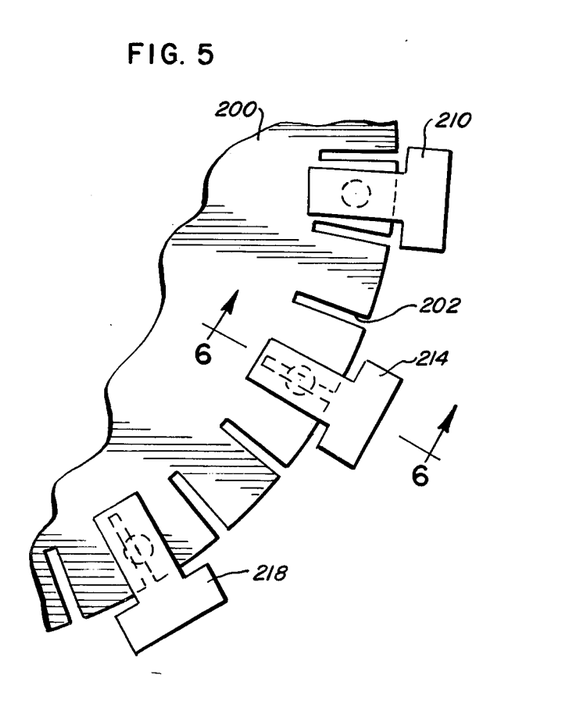
FIG. 5 is an illustrative representation of the pulse generator pickup units, showing their proper orientation with respect to the chopper wheel.

As mentioned above, the sensors 214 and 218 are positioned with respect to the chopper wheel 200 and one another to be out-of-phase by one-half of the width of a slot 202. Pulses are generated by the sensors 214 and 218 as the chopper wheel interrupts the infrared light emission from the light emitting diode 220 to the light sensitive transistor 222. The location of the sensors 214 and 218 is such that the resultant pulses will overlap approximately one-half of the pulse width. It is the position relationship between the two pulses in lines 230 and 232 which determines the direction of counting. The two overlapping pulses on lines 230 and 232 are fed simultaneously into the direction sensing unit 236. However, only one pulse results from the direction sensing unit as the sensors 214 and 218 each detect the passage of a slot and input a signal to the direction sensing unit. The direction sensing unit has two output lines 246 and 248 to the frame counter 240. A "forward" signal from the direction sensing unit to line 246 causes the frame counter 240 to increment. A "reverse" signal through line 248 causes the frame counter to decrement.

Figure 7:
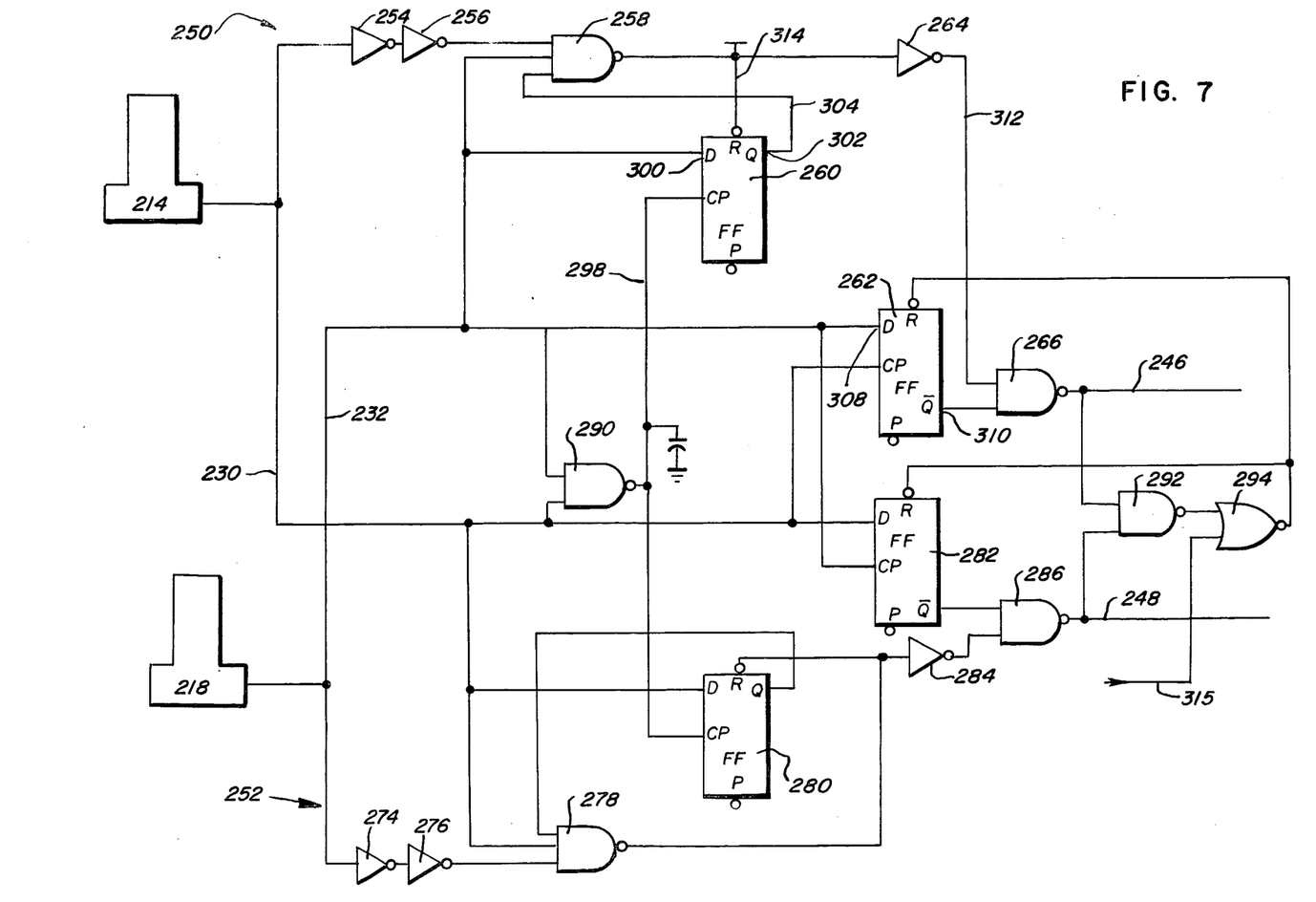
FIG. 7 is an electrical diagram of the components of the direction sensing means.

FIG. 7 is an electrical circuit diagram showing the components of the direction sensing unit 236. The direction sensing circuit comprises two identical logic circuits, one, generally designated 250, produces the "forward" or incrementing frame counter pulse, and the second, generally designated 252, produces the "reverse" or decrementing frame counter pulse. The operation of the circuits 250 and 252 can be more easily understood with respect to a time scale explaining the outputs of the sensors 214 and 218.

For illustrative purposes assume that a position "A" represents a position of the chopper wheel 200 where both of the sensors 214 and 218 are blocked, and so on, as follows:

Position "B" represents a position where sensor 214 is in alignment with the beginning edge of a slot while sensor 218 is still entirely blocked.

Position "C" represents a position where sensor 214 is aligned along the centerline of a slot 202 and sensor 218 is at the beginning edge of a slot 202.

Position "D" represents a position where sensor 214 is at the trailing edge of a slot 202 and sensor 214 is aligned along the centerline of a slot 202.

Position "E" represents a position period when sensor 214 is completely blocked and sensor 218 is on a trailing edge of a slot 202. Continued movement of the chopper wheel 200 brings the chopper wheel back to position "A" where both of the sensors 214 and 218 are completely blocked.

Referring to FIG. 7, the forward or incrementing circuit 250 includes the following integrated circuit elements: two inverters 254 and 256, a gate 258, a flipflop 260, a second flipflop 262, an inverter 264, and a final gate 266. The reverse or decrementing circuit 252 comprises: two inverters 274 and 276, a gate 278, a flipflop 280, a second flipflop 282, an inverter 284, and a final gate 286. Three other gates 290, 292 and 294 are common to both direction circuits 250 and 252. As the chopper wheel 200 rotates, the first sensor 214 generates an output signal along line 230 which is a negative pulse at position "B" according to our time relationship. This signal is inverted two times at 254 and 256 which also delays the signal. This pulse continues from position "B" to position "D", then stops. The second sensor 218 generates an output signal along line 232 beginning at position "C" and ending at position "E". A clock pulse is generated at the output of gate 290 and relayed through line 298 to the flipflops 260 and 280 of the respective forward and reverse circuits.

When the chopper wheel 20 is rotating in the forward direction the edge of the clock pulse, clocks the data appearing at the input point 300 of the flipflop 260. Just prior to the clock pulse the input point 300 is high with the signal from line 232 and therefore the output from the flipflop 260 at point 302 is clocked to be a high level. Line 304 inputs this high signal to the gate 258. At the same time the gate 258 receives a low signal from line 230 and a high signal from line 232. As the chopper wheel 200 continues to rotate, the second sensor 218 outputs a low signal at position "C", above. As the chopper wheel 200 continues to rotate, the slot passes the sensor 214 at position "D" and the signal along line 230 changes to positive. As the signal along line 230 changes to positive, it clocks the data appearing at 308 of the flipflop 262. This is the low signal along line 232 because the sensor 218 is still in alignment with a slot. However, since it already was in this state, no change occurs at the output point 310 of the flipflop 262 and the signal is fed into the gate 266. As the disc continues to rotate to position "E", where the sensor 218 is blocked, the input changes to positive. At this point, the three inputs to gate 258 are all positive and thus the output becomes negative. This negative pulse is inverted at the invertor 264 and becomes positive. This positive signal is input through line 312 to the gate 266 which outputs a negative pulse along line 246 to the frame counter 240 which increments one unit.

The pulse width of the signal along line 246 is determined by the width of the positive signal in line 312 to the gate 266. The width of this signal is determined by the output of gate 258. When the output of gate 258 is low it is fed to the flipflop 260 through line 314 which returns the output at point 302 to a low state thereby feeding back the low signal to the gate 258. At that time, the input to the gate 266 goes low thereby terminating the negative pulse along line 246. When the output of line 246 is low it causes a pulse to be generated and to be fed to both the flipflops 262 and 282 to return their states to low. A master restart signal, to be described below, is generated in line 315 when the system is initially energized to assure that the flipflops 262 and 282 come up in the appropriate states. Thus, the direction sensing unit requires a completed signal from the sensor 214 and a completed signal from the sensor 218 to be received before an output or "forward" signal is input through the frame counter. The circuit 252 is identical to the circuit 250 and operates in an identical manner. Therefore, in a reverse operation, the signal from the sensor 218 must initiate before but overlap the occurrence of the signal from the sensor 214. The signal from the sensor 214, however, must also end after the signal ends from the sensor 218. Any combination of abrupt direction changes in the rotation of the sprocket shaft 28 will cause the respective signals along lines 230 and 232 to be fed into the direction sensing means 236. Because of the required relative occurrences of the signals it is not possible to cause ambiguities to be developed to create a miscount in the counter 50. In this manner, a laboratory technician may rotate the sprocket shaft 28 in any combination of directions and the direction sensing means 236 will always maintain the counter 50 with correct input to maintain a proper count of the film passage.

COUNTER

The film lapse counter unit 50 includes the frame counter 240, a feet counter 340, a frame counter loader 342, an integer coincidence detector 344, an advance foot counter unit 346, a frame counter clearing unit 348 and a frame modulus programmer, generally designated 350. The frame modulus programmer 350 includes a plurality of presettable switches 352 which permit the frame count cuer 14 to be adapted to any film format which has an integer number of frames per foot up to 100 frames/foot. The most common film formats are 35mm having 16 frames per foot, 16mm having 40 frames per foot, super 8 having 72 frames per foot and 8mm having 80 frames per foot and they are therefore adaptable to this frame count cuer 14. The frame modulus programmer is provided on the film lapse counter unit to allow the technician to preset the frame count cuer in accordance with the film format being printed by the film printer 10. The frame modulus programmer 350 is set according to the number of frames per foot used in the film format being printed. For example, if 16mm film is being printed, the programmer 350 is manually set to 40 which indicates 40 frames per foot. This information is used by the film lapse counter to advance the feet counter 340 one unit each time the frame counter reads the passage of 40 frames of film on the printer. Referring to the bottom of Fig. 2, the direction sensing unit 236 is seen connected to the input leads 230 and 232 from the sensors 214 and 218 respectively. The direction sensing unit 236, as previously described, has two output leads 246 and 248. A signal representing one frame in the forward direction is fed into the frame counter 240 on line 246 for each frame passing through the exposure aperture 20 in the forward direction. Similarly, a signal representing one frame moving past the exposure aperture 20 in the reverse direction is fed on line 248 to the frame counter 240. The frame counter then will increment or decrement one frame for each pulse depending upon the direction of travel of the film. The frame modulus programmer 350 is connected by a lead 362 to the integer coincidence detector 344 which stores the program information corresponding to the film format. For example, when using 16mm film, the frame modulus programmer is set at 40 and this value is stored in the integer coincidence detector 344. The output from the frame counter 240 is fed through line 366 to the integer coincidence detector 344. When the frame counter, in the example, reaches 40, the integer coincidence detector 344 notes the coincidence, and sends a signal through line 368 to the advance foot counter unit 346. The advance foot counter unit 346 sends a signal through line 370 to the feet counter 340 to increment the feet counter one integer and to the frame count clearer 348 which sends a signal through line 372 to the frame counter 240 which resets and again begins counting at zero.

The output of the frame counter also is visually recorded in the two righthand columns 376 and 378 of a visual counter display, generally designated 380. The column 378 represents tens of frames and the column 376 represents unit frames. The feet counter 340 similarly visually records the feet information in the remaining four columns 384, 386, 388 and 390 of the visual counter display 380. The columns 384 through 390 represents units feet, tens of feet, hundreds of feet, and thousands of feet respectively.

A few minor changes occur in the operation of the previously described film lapse counter unit 50 when the direction sensing unit 236 outputs a "down" signal.

When in the "milestone" mode the frame lapse counter 50 records the absolute position of the film. Therefore, the counter 50 will increment when the sprocket 24 rotates in the forward direction and decrement when the sprocket 24 rotates in the reverse direction regardless of which direction the film printer is set to print. However, in the "batch" mode the counter will increment when the sprocket 24 rotates in the direction (forward or reverse) which corresponds to the direction in which the film printer is set to print. For example, when the printer is set to print in the forward direction the counter 50 will increment as the sprocket 24 rotates in the forward direction. If the printer is set to print in the reverse direction, the counter 50 will increment when the sprocket 24 rotates in the reverse direction and decrement when the sprocket 24 rotates in the forward direction.

If the direction sensing unit 236 outputs through line 248 the frame counter 240 will decrement instead of increment. The output operates in a similar manner to cause the integer coincidence detector 344 to note a coincidence between the frame counter and, in our example, the 40 set in the programmable modulus.

However, in this instance, the advance foot counter unit 346 does not output to the feet counter 340. A line 392 from the direction sensing unit feeds a signal to the advance foot counter 346 to nullify the signal from the integer coincidence detector and therefore eliminate an increment to the feet counter. Line 362 also connects the frame modulus programmer to a present input side of the frame counter 240. As the frame counter decrements and reaches zero, the frame counter outputs a borrow signal through line 394 to the feet counter unit 340 to cause it to decrement one unit. The same borrow signal also is fed into the frame count loader 342 which signals the frame counter through line 396 to load in the preset value 40 of the frame modulus programmer. The frame counter then will continue to decrement again from 40 and each time it passes zero will generate a signal to decrement the feet counter and reload the frame counter with the predetermined value set by the frame modulus programmer.

The frame memory modulus reset unit 163 also is preset with the information from the frame modulus programmer, to permit the use of the cue advance unit 54 as previously described in the general description of the frame count cuer. This cue advance system will be described in detail after the description of the operation of the remaining components of the frame count cuer.

Referring again to FIG. 2, the output of the feet counter 340 is fed to a coicidence detector 400. Likewise the output of the frame counter 240 is fed to the coincidence detector 400. The information in the feet memory 160 is fed to the coincidence detector by line 402 and similarly the information from the frame memory is fed to the coincidece detector through line 404. The coincidence detector constantly compares the value of the film lapse counter 50 with the storage unit 46 and when coincidence occurs, signalling a required change in the light valves of the variable light source 22, outputs a signal through line 406 to a cue generator 410.

When the signal is received, the cue generator generates a pulse which is fed through line 412 to the tape control logic unit 48. The tape control logic unit 48 signals the tape advance unit 102 to begin reading more information from the tape 40. The tape control logic unit 48 sends a cue signal to the controlled light source 22 through line 415. This cue signal remains valid for approximately twenty-four miliseconds until the tape counter 124 registers a value of five. The tape counter 124 validates line 133 which signals the tape control logic unit 48 to discontinue the cue signal.

The cue signal is also fed into a clear foot counter 418. If the batch line 65 is valid the clear foot counter unit 418 sends a signal through line 420 to the feet counter 340 to reset the feet counter to zero and to the clear frame counter unit 348 to reset the frame counter 240 to zero. However, if the batch line 65 is not valid, i.e., if the laboratory is using the milestone method, the clear foot counter sends no signal through line 420.

The cue generator 410 sends an inverted cue pulse to a master reset unit 422 through line 424. This second cue signal also is fed into the tape control logic unit. The master reset unit 422 will output a master reset signal through 315 to reset several components.

The loop mode operation permits a short film segment 18 to be spliced end to end to form a continuous film loop. In this method or mode, the scene length tape 42 also is connected with its head end spliced into its tail end. This operation is useful when the proposed preprint film section 18 is less than one-half the size of the conventional raw stock reel. In the loop method the film printer will continuously operate and continuously make duplicate copies of the preprint film segment until the raw stock is exhausted. To accommodate this function, a special code is punched in the scene length tape in order to cause the tape reader to continue reading past the end of a film segment by resetting all of the frame count cuer resettable components.

More particularly the last group of information on the scene length tape is punched with binary coded $8 \times 10^3$ feet information. This information is read by the tape reader and fed via line 116 to the foot memory unit 160. The foot memory unit will store this information separately from the foot memory information relating to the film scene lengths. When this information is stored in the feet memory 160 the line 440 from the feet memory unit to the master reset unit is valid. This cue point in the loop mode is the preprint film synchronization point. When the coincidence detector 400 signals to the cue generator 410 to output a cue signal, the signal into the master reset is anded with the $8 \times 10^3$ feet signal to output a signal to the synchronization (sync) pulse gate 442 through line 444. The sync pulse gate then outputs a signal to line 448 to the clear foot counter unit 418 which causes the foot counter 340 and the frame counter 240 to be reset to zero thereby permitting the tape control logic unit 48 to read in the next portion of information which will be the first information recorded on the scene length tape to initiate the process again until the raw stock is exhausted.

The remaining element of the frame count cuer, namely the cue advance unit 54, is described below. Since, as previously mentioned, the controlled light source and vanes therein have an inherent time delay, it is desirable to advance the cue signal in order to correctly and exactly actuate the light vanes to cause the cue signal to be generated at a position in advance of the programmed frame line. This is accomplished in the preferred embodiment by incrementing or decrementing the frame memory unit 164 by a predetermined number of frames to cause the cue signal to be generated prior to the exact film position. For example, when using 16mm film, it is desirable to have the cue signal generated when the film is at a position two frames in front of the counter position wherein the light change is desired. This is accomplished through the use of the cue advance unit 54. In the forward direction this advance cuing occurs by decrementing the memory. In the reverse direction cuing occurs by incrementing the memory.

The cue advance unit 54 includes a cue advance counter 450, a frame cue advance logic unit 452, an oscillator 454, a count direction control unit 456, and a programmable cue advance, generally designated 458. The programmable cue advance includes a plurality of switches 360 which permit a binary coded value from 1 to 10 to be preset in a cue advance counter 450. As will be explained later, the programmable cue advance is set to a value representing ten minus the desired number of frames to be advanced or decremented. For example, when using 16mm film the desired cuing advance to accommodate the delay of the controlled light source is two frames. Thus, the correct setting of the programmable cue advance 458 would be 8. The cue advance logic unit 452 receives a signal from line 134 when the eighth row or step of the scene length tape 40 is read. The logic unit 452 signals the oscillator 454 to output.

As the oscillator outputs, a signal is fed through line 460 to the cue advance counter which increments, in this case, one through nine. The oscillator 454 will continue to output signals until the cue advance counter 450 increments to ten. At that time a signal is output through line 464 to the logic unit 452 which, in turn, signals the oscillator to stop. In the "milestone" mode each time information is read by the tape reader 42 it corresponds to the position of the light change. Therefore, the cue advance unit 54 will adjust the storage unit 46 each time the line 134 signals the passage of eight rows of information. However, in the "batch" mode, line 65 is valid and will cause only one cue advance at the first storage entry.

While the cue advance counter has been incrementing, a corresponding oscillator signal has been fed through line 466 to a count direction control unit 456. The count direction control unit, depending upon which line is valid, the forward line 62 or the reverse line 63, outputs information through line 470 or 472 respectively. The line 470 causes the frame memory counter to which it is connected to decrease while a valid line 472 causes the frame memory counter to increase. Thus for forward operation of the film printer, two units or frames would be subtracted from the memory and during reverse use of the printer two frames or units will be added to the frame memory. This method therefore will cause coincidence between the storage unit 46 and the frame lapse counter unit 50 two frames before actual coincidence between the memory display unit 140 and the counter display unit 380. Therefore the user will always be able to visually check the correct position of the light change by looking at the memory display panel while the frame count cuer automatically advances the cue signal to accommodate for the inherent time delay of the controlled light source 22.

The frame memory unit 164 can store information up to the number of frames preset by the frame modulus programmer 350. Thus, in the example, if the frame position stored in the memory is only one frame, an allowance must be made for the subtraction of two frames therefrom. Therefore, as previously mentioned, the frame modulus programmable means is connected to the frame memory modulus reset 163. During input for decrementing of two units from the cue advance unit 54, it is necessary to reload the frame memory unit with the frame modulus value of 40. If, for example, the frame memory unit is storing the information one frame, and it is desired to decrement it by two frames, the required frame memory information would then be 39 and would require a decrement of 1 foot from the feet memory unit 160. This is accomplished by a borrow signal from the frame memory unit 164 being fed into the load frame memory unit 170 via line 474. The frame memory unit 164 will output a signal through line 476 to the feet memory unit 160 causing it to decrement. Line 476 also inputs a signal to the load frame memory unit 170 which when combined with the borrow signal on line 474 resets the frame memory to the preset value by a signal via line 172.

When it is desired to add, for example, two frames to the frame memory unit 164, it is necessary to increment the foot memory unit 160 in the event that the frame modulus 40 is passed. This is accomplished through the output line 404. The frame memory modulus reset 163 then outputs a signal via line 478 to the feet memory unit 160 to cause it to increment one integer and to the clear frame memory unit 480 which inputs a signal via line 482 to the frame memory unit 164 to reset that unit to zero.

The frame count cuer 14 is also provided with currently available vernier type cue advance units which may be adjusted by the laboratory technician in the event that a cue advance is required which is less than one frame length. For example, if a two and one-half frame cue advance is desired, the frame count cue advance unit is set to two which will cause two frame cue advance. The vernier type cue advance will be set to one-half of a frame to further advance the cue signal by the additional one-half frame.

The frame count cuer 14 includes a double tape advance unit 490 which is operable when the frame count cuer and photographic printer are reversed in direction. A direction transition signal is generated by a gate in the double tape advance unit whenever line 63 goes valid and line 62 goes invalid or vice versa. This signal is fed through line 492 to the tape advance unit 102 which cases the tape advance unit to signal the tape reader to reverse two sets of information so that when it reads the next set of information in a forward direction that information will correspond to the preceding scene length.

The entire frame count cuer 14 of the preferred embodiment is optically isolated from the photographic film printer to prevent any extraneous electrical impulses or "noise" from entering the frame count cuer which operates at approximately 5 volts. The interface between the frame count cuer and the photographic printer is provided with a plurality of light emitting diodes 493 which transfer the information to the film printer by a similar number of light sensitive transistors 495 which comprise an optical isolation system generally designated 497. The information received by each transistor then is amplified to enable it to operate the solenoids and other machine components which operate at approximately 165 volts. In this manner, all signals to the photographic film printer 10 are in the form of light rays which are sensed by light sensitive transistors. These optical isolators therefore prohibit the transfer of electrical impulses from the film printer to the frame count cuer which could affect the logic of the cuer.

The frame count cuer 14 includes an operator controlled toggle switch, generally designated 492, which permits the lab technician to control the reset of the film lapse counter unit 50. Referring to FIG. 3, the toggle switch 492 includes three positions, a top, auto position, a bottom, manual position and an intermediate position. The top auto position, shown connected to the valid line 68, transmits the start signal to a synchronization pulse generator 500 through line 502. In this position, each time the film printer is started, a synchronization pulse will be generated and fed into the sync pulse gate 442 through line 504. As described previously, in the loop mode description, the sync pulse generator outputs a signal which will reset all of the counters. In this automatic position, any stop and restart of the film printer will always reset the counters. For many operations, however, it is desirable to maintain the count on the film lapse counter unit so that the printer may be restarted and continue printing from a stopped position. For example, at the end of a film and tape, when using the milestone method, if a print is to be made in the reverse direction, the information stored in the counter must be retained to provide the correct scene length positions. For this reason, the present frame count cuer 14 is provided with the intermediate position which does not reset the counters every time the film printer is restarted. Therefore, if a film printer is shut down or turned off for some reason, the frame count cuer retains the information relating to the position of the film and when the film printer is restarted the count information on the frame lapse counter unit 50 will correspond with the film 18. This is especially desirable since it permits midreel stop and restart as well as reverse start using the milestone method. If for any reason, the operator desires to reset the counters, he merely moves the toggle switch to the low manual position which automatically resets all of the counters.

The frame count cuer disclosed herein also includes a fail safe operational system. Another toggle switch which is not shown in the block diagrams, permits the film printer to be operated in the notch or RF modes without disconnecting the frame count cuer. For example, if one of the components in the frame count cuer 14 malfunctions and the frame count cuer is not usable, the technician merely throws the toggle switch to the notch RF position which will permit operation of the film printer in the usual manner.

The foregoing detailed description has been given for clearness of understanding only and no unnecessary limitations should be understood therefrom as many modifications will be obvious to those skilled in the art.

I claim:

1. An apparatus for monitoring the passage of film through a photographic film printer and for controlling the operation of the printer in accordance with the monitoring information, wherein the printer includes a selectively controllable light source and a signal generator providing an output signal related to the quantity of film passing through the printer, comprising:
   storage means for storing film frame addressing cuing information in integral units of length greater than a frame and in numbers of frames;
   a bi-directional counter unit including a direction sensing means for connection with the signal generator providing an incremental or decremental count in said integral units of length and in numbers of frames of the film passing through the printer;
   comparator means for comparing the information in said storage means with the count of said counter unit and providing an output cue signal to said printer upon the occurrence of a predetermined relation between the storage means and said counter unit wherein the comparator means includes a programmable means for selectively varying said information stored in said storage means to provide for the occurrence of a predetermined relation between the storage means and the counter unit either in advance of or after the information originally stored in the storage means; and
   selectively actuatable reset means connected to said comparator means to reset said bi-directional counter upon the occurrence of said cue signal.

2. The apparatus of claim 1 wherein the counter unit includes an individual frame counter driven by said signal generator and an integral unit length counter, said frame counter including means to actuate said integral unit length counter when the frame count reaches a predetermined value equivalent to the number of frames of the particular integral unit of film length.

3. The apparatus of claim 2 including a prgrammable means for selectively varying said predetermined value to correspond with the format of the film passing through the printer.

4. An apparatus for monitoring the passage of film through a photographic film printer and for controlling the operation of the printer in accordance with the monitoring information, wherein the printer includes a selectively controllable light source and a signal generator providing an output signal related to the quantity of film passing through the printer, comprising:
   storage means for storing frame address cuing information in integral units of length greater than a frame and in numbers of frames;
   a bi-directional counter unit including a direction sensing means for connection with the signal generator providing an incremental or decremental count in said integral units of length and in numbers of frames of the film passing through the printer; and
   comparator means for comparing the information in said storage means with the count of said counter unit and providing an output cue signal to said printer upon the occurrence of a predetermined relation between the storage means and said counter unit wherein the comparator means includes a programmable means for selectively varying said information stored in said storage means to provide for the occurrence of a predetermined relation between the storage means and the ocunter unit either in advance of or after the information originally stored in the storage means.

5. A frame count cuer for monitoring the passage of film through a film printer and for controlling the operation of a selectively controllable light source on the printer in accordance with the monitoring information, comprising:
   a signal generator on the film printer providing an output signal related to the quantity of film passing through the printer;
   a control element bearing film frame cuing information;
   reader means for reading the control element and providing a signal related to said cuing information in integral units of length greater than a frame and in numbers of frames;
   storage means connected to the reader means for storing film frame cuing information read by said reader means in said integral units of length and numbers of frames;
   direction sensing means connected to the signal generator providing a first signal for film passing through the printer in a first direction and a second signal for film passing through the printer in a second direction;
   a counter unit connected to the direction sensing means for receiving said first and second signals from the direction sensing means to provide a count in integral units of length and numbers of frames of film passing through the printer; and
   comparator means for comparing the information in said storage means with the count of said counter unit and providing an output cue signal to said printer upon the occurrence of a predetermined relation between the storage means and said counter unit wherein the comparator means includes a programmable means for selectively varying said information stored in said storage means to provide for the occurrence of a predetermined relation between the storage means and the counter unit either in advance of or after the information originally stored in the storage means.

6. The frame count cuer of claim 5 wherein the counter unit includes a frame counter driven by the signal generator and an integral unit length counter actuated by the frame counter when the frame counter reaches a predetermined value.

7. The apparatus of claim 6 including a programmable means for selectively varying said predetermined value to correspond to the format of the film passing through the printer for recording by the counter unit in integral units of length greater than a frame and in numbers of frames.

8. The frame count cuer of claim 7 wherein said counter unit includes a frame comparator connected to said frame counter and said second programmable means, said frame comparator providing a coincidence signal when the count of said frame counter coincides with said value stored in said storage means, said coincidence signal being fed to said integral unit length counter for recording and to said frame counter for reset thereof.

9. The apparatus of claim 5 including means to couple said signal from said comparator means to said variable light source for causing said light source to be set to a preferred value for a subsequent scene to be printed.

10. The frame count cuer of claim 5 including reset means for resetting said counter unit upon the application of a cue signal thereto, and switch means connected between said comparator means and said reset means so that the signal from said comparator means may be selectively connected to said reset means for reset of the counter unit.

11. The device of claim 5 wherein said reader means comprises a tape reader for reading information from said control element which comprises a punched tape bearing information related to film frame cuing addresses.

12. The frame count cuer of claim 5 including a control element reverse drive means providing the reader means with the correct cuing address information when said frame count cuer and film printer are operated in a reverse mode.

13. The frame count cuer of claim 5 wherein the storage unit comprises a plurality of units including a one of ten decoder responsive to the output of said tape reader for selectively directing information read by said reader means to the appropriate storage means unit.

14. A frame count cuer for monitoring the passage of film through a film printer and for controlling the operation of a selectively controllable light source on the printer in accordance with the monitoring information, comprising:

a signal generator on the film printer providing an output signal related to the quantity of film passing through the printer;

a control element bearing film frame cuing information;

reader means for reading the control element and providing a signal related to said cuing information in integral units of length greater than a frame and in numbers of frames;

storage means connected to the reader means for storing film frame cuing information read by said reader means in said integral units of length and numbers of frames;

direction sensing means connected to the signal generator providing a first signal for film passing through the printer in a first direction and a second signal for film passing through the printer in a second direction;

a counter unit connected to the direction sensing means for receiving said first and second signals from the direction sensing means to provide a count in integral units of length and numbers of frames of film passing through the printer; and comparator means for comparing the information in said storage means with the count of said counter unit and providing an output cue signal to said printer upon the occurrence of a predetermined relation between the storage means and said counter unit wherein the comparator means includes a first programmable means for varying said information stored in said storage means to provide for the occurrence of a predetermined relation between the storage means and said counter unit in advance of the information received from said reader means.

15. The frame count cuer of claim 14 wherein the first programmable means is a cue signal advance unit which selectively decreases or increases the information in said storage means to advance the signal to the printer to accommodate the inherent delay of the printer components.

16. A frame count cuer for monitoring the passage of film through a film printer and for controlling the operation of a selectively controllable light source on the printer in accordance with monitoring information, comprising:

a signal generator on the film printer providing an output signal related to the quantity of film passing through the printer;

a control element comprising a punched tape bearing film frame cuing information;

reader means for reading the control element and providing a signal related to said cuing information in integral units of length greater than a frame and in numbers of frames;

storage means connected to the reader means for storing film frame cuing information read by said reader means in said integral units of length and numbers of frames;

direction sensing means connected to the signal generator providing a first signal for film passing through the printer in a first direction and second signal for film passing through the printer in a second direction;

a counter unit connected to the direction sensing means for receiving said first and second signals from the direction sensing means to provide a count in integral units of length and numbers of frames of film passing through the printer; and comparator means for comparing the information in said storage means with the count of said counter unit and providing an output cue signal to said printer upon the occurrence of a variable predetermined relation between the storage means and said counter unit, wherein the control element is formed in a loop and said cuer includes a discriminator means for sensing a predetermined code upon said tape, and master reset means connected to said discriminator means providing a reset signal to the counter unit upon sensing the predetermined code for continuous, loop operation of the frame count cuer.

* * * * *